United States Patent Office 3,637,888
Patented Jan. 25, 1972

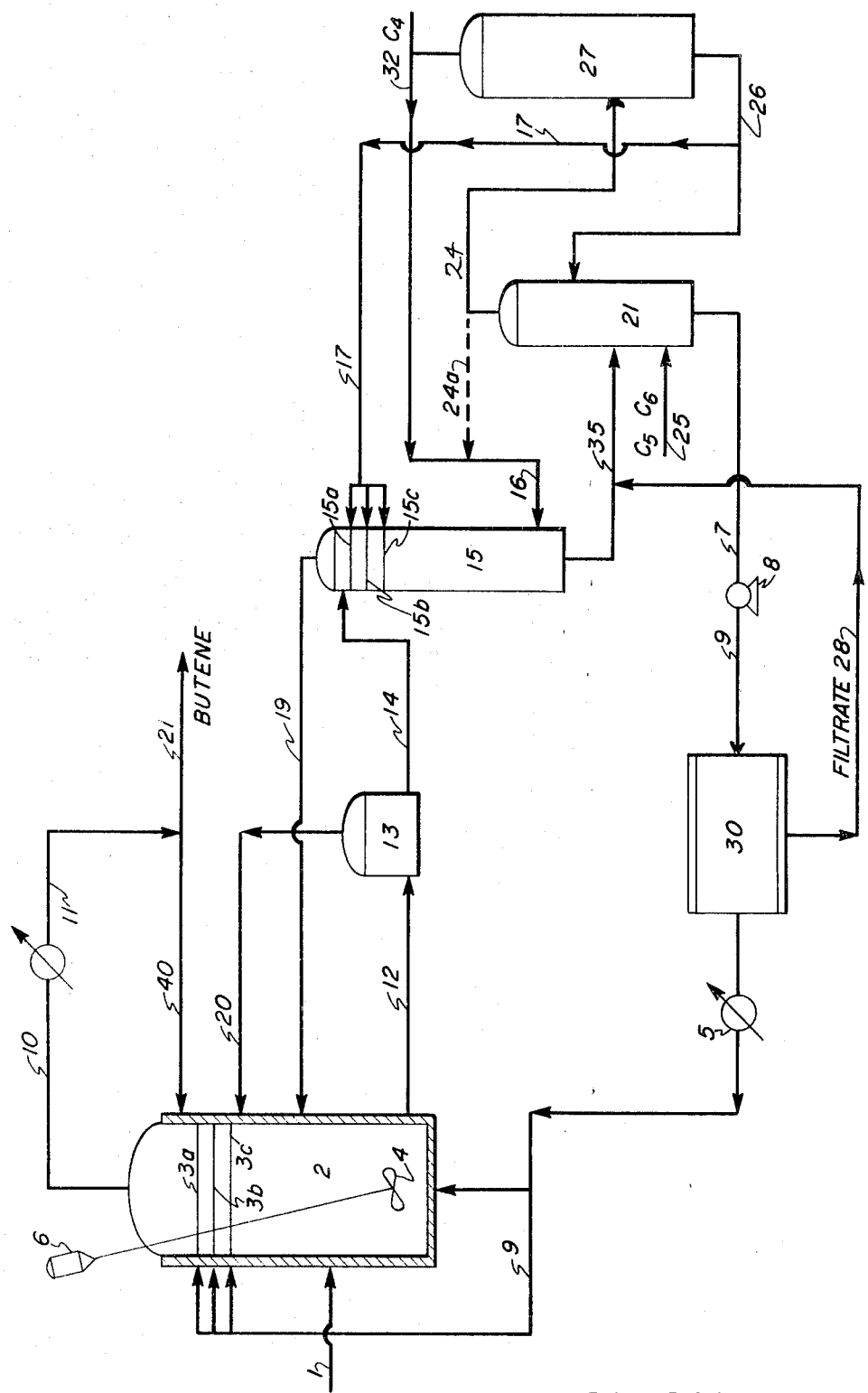

3,637,888
RECOVERY OF HIGH PURITY BUTADIENE BY CUPROUS SALT PARTICLES IN ALL SLURRY PROCESS
Robert P. Cahn, Millburn, N.J., and Richard J. De Feo and James H. Taylor, Jr., Baton Rouge, La., assignors to Esso Research and Engineering
Filed Feb. 26, 1970, Ser. No. 14,408
Int. Cl. C07c 7/00, 7/16, 11/16
U.S. Cl. 260—681.5 C        11 Claims

ABSTRACT OF THE DISCLOSURE

Recovery of high purity butadiene by liquid phase slurry complexing is conducted with an active cuprous halide sorbent slurried in a paraffin-containing organic diluent, coupled with slurry stripping and desorption of complexed butadiene in the presence of the diluent. The pressures and temperatures are carefully controlled during the complexing step in order to provide a high driving force so as to obtain a high rate of butadiene complexing with the cuprous halide, and to achieve a high loading of the sorbent with complexed butadiene. In addition, other novel and improved techniques for recovering the high purity butadienes are disclosed.

---

The present invention is directed to an improved process for separating 1,3-butadiene from hydrocarbon streams containing it by use of cuprous halide sorbents. In one aspect, this invention relates to a process for improving the rate and degree of completeness of reaction of the butadiene with the cuprous halide sorbent. In another aspect, this invention relates to a process for improving the rate of removing 1,3-butadiene from a stream containing, in addition to the 1,3-butadiene, close boiling $C_4$ monoolefins such as butene-1, butene-2, isobutylene and butane, which are less valuable and very difficult to separate from 1,3-butadiene in straightforward distillation procedures.

A recently-issued patent, U.S. 3,412,172, patented on Nov. 19, 1968, describes a process for separating 1,3-butadiene from hydrocarbon streams containing it by use of cuprous halide sorbents. The subject invention is directed to novel and improved processing techniques which enable the 1,3-butadiene to be more easily separated in a more economic manner than was heretofore thought possible.

An object of the present invention is to improve the rate and completeness of reaction between the butadiene and the cuprous halide sorbent during the complexing thereof;

Another object of this invention is to provide a process for improving on the purity of the 1,3-butadiene recovered;

Another object of this invention is to provide a process for maintaining the cuprous halide salt in an active condition during the decomplexing stage;

Yet another object of the subject invention is to provide a process for decreasing the amount of diluent which must be circulated throughout the system;

A still further object of the subject invention is to provide novel and improved processing techniques for recovering 1,3-butadiene from the feedstream containing it in a more economic and facile manner;

It is a still further object of the present invention to conduct the entire liquid phase slurry complexing in a single stage.

Other objects and many of the attendant advantages of this invention will be readily appreciated as the same becomes better understood by reference to the following detailed description, which is to be considered in connection with the accompanying drawings wherein:

The sole figure represents a schematic flow diagram of a process for separating 1,3-butadiene from a feed material containing it and recovering it with the novel features of this invention illustratively associated therewith.

Briefly, this invention relates to an improved process for recovering high purity 1,3-butadiene from a hydrocarbon feedstream containing it along with $C_4$ monoolefins and $C_4$ alkanes, said process comprising the steps of contacting said feedstream in a tower with a liquid slurry containing solid, sorption-active cuprous halide sorbent particles selected from the group consisting of cuprous chloride, cuprous bromide and cuprous iodide, said particles having a porosity of above about 10% based on the volume of the particle, 550–10,000 A. pores in an essentially anhydrous organic liquid slurry medium containing an extraneous inert liquid paraffin diluent which is essentially inert to reaction with said cuprous halide sorbent which has an atmospheric boiling point higher than 1,3-butadiene, $C_4$ monoolefins and $C_4$ alkanes contained in said feedstream and which has an atmospheric boiling point lower than that temperature at which said cuprous halide particles deactivate significantly, said contacting being conducted at a given temperature and pressure sufficiently above the complexing equilibrium point of said 1,3-butadiene with said sorption-active cuprous halide sorbent particles in order to drive the 1,3-butadiene to complex with said sorption-active cuprous halide sorbent particles; introducing said slurry at intermediate points along said tower; countercurrently passing said slurry through the uncomplexed butadiene contained in said feedstream providing sufficient residence time in the bottom of said tower to achieve high loading of the cuprous halide complexing agent with butadiene-1,3 introduced with the feed liquid and other streams to be discussed below; passing said slurry containing said solid complex to a stripping tower; introducing solvent vapors at intermediate points along said stripping tower and a butadiene containing vapor at the bottom of said stripping tower; countercurrently passing said 1,3-butadiene through the liquid slurry containing said solid complex, thereby stripping from said solid complex and liquid slurry medium uncomplexed materials and materials less preferentially complexed than 1,3-butadiene while maintaining a liquid slurry of said solid complex particles in said inert liquid diluent; desorbing said solid complex particles in the presence of said liquid slurry diluent and, if desired, also in the presence of a hydrocarbon selected from the group consisting of pentane and hexane and substantially in the absence of $C_4$ monoolefins; separating said decomplexed 1,3-butadiene from said inert liquid slurry containing the solid sorption-active cuprous halide sorbent particles and said inert liquid diluent.

The feed material for this 1,3-butadiene recovery process may be obtained by fractionating the products of thermal or catalytic cracking, coking and other means of processing crude refinery cuts such as light naphtha, gasoline, kerosene and similar fractions to obtain the $C_4$ cut. While the composition of the 1,3-butadiene containing feedstream can vary widely, this feed will always contain 1,3-butadiene and butene and should be completely free of bulk water. The presence of bulk water causes the formation of degradation products in the cuprous halide sorbent solids, which in turn, promote low butadiene product purity. Furthermore, the presence of bulk water exerts a corrosive influence on the apparatus employed in separating and recovering 1,3-butadiene. Prior to conducting the process of this invention, it is necessary to insure that the liquid slurry medium contains an inert liquid paraffin diluent which, as the 1,3-butadiene containing stream does not itself contain such diluent, must be added to the system prior to subjecting the feedstream to the process of this invention.

With reference to the sole figure, a 1,3-butadiene containing feedstream 1 comprising 1,3-butadiene, butene, butanes, some $C_5$'s propylene and various acetylenes is fed to a liquid phase slurry complexing vessel 2. Complexing vessel 2 is a jacketed vessel which is equipped with trays 3a, 3b and 3c, in the top thereof in order to afford a complexing zone in that area of the vessel as well as in the bottom portion. Vessel 2 is equipped with a stirrer assembly 4, driven by a suitable motor 6.

We have now discovered that if the feedstream containing the 1,3-butadiene is contacted with the cuprous chloride halide complexing slurry at conditions sufficiently above the complexing equilibrium point of the butadiene with the cuprous halide sorbent particles, that not more than two complexer reactors and in most cases only one is required in order to obtain maximum product recovery as well as a high purity.

These conditions are such that a high loading of the solid in the liquid diluent is obtained where loading is defined as the fraction of theoretical extent of utilization of the cuprous halide complexing agent in complexing butadiene, i.e., the completeness of the complexing reaction. The butadiene concentration in the complexer 2 in the liquid is maintained in a range of from 8–15%, preferably 10 to 12 mole percent. The temperature is maintained in a range from 70°–120° F., preferably 90° to 110° F. and the pressure is maintained in a range of from 17 to 42 pounds per square inch absolute. Preferably, the pressure is maintained in a range from 28 to 30 pounds per square inch absolute.

Slurry containing the inert liquid diluent and the cuprous halide sorption-active particles is introduced via line 9 into the lower portion of the complexer 2; at the same time, a portion of this slurry is introduced at intermediate trays, 3a, 3b and 3c, in the top of the complexer 2.

By introducing the slurry at various intermediate points along the top of the complexing reactor 2, the slurry then is able to complex the excess butadiene introduced into the top section of the complexing unit 2 via the vapor leaving the bottom hold-up section of vessel 2.

The conditions of pressure and temperature are maintained at different ranges in the different sections of the tower. The top of the tower is maintained in a pressure ranging from about 15 to 28 pounds per square inch absolute and the temperature is maintained in the range of from 30° to 45° F. The intermediate plates are maintained at a slightly higher pressure, still in the range of about 15–28 pounds per square inch and a temperature ranging from 45° to 70° F. and the bottom plates are maintained at a pressure of approximately 15–28 pounds per square inch and a temperature ranging from 70° to 110° F.

The slurry is introduced in gradually decreasing amounts so that from 1–10 volume percent is introduced into the area depicted 3a and from about 10 to 40% into the areas depicted by 3b and 3c, and from 50 to 90 volume percent is introduced into the bottom of the absorber.

By introducing only a small amount of slurry containing the active cuprous halide sorbent particles at the lowest temperature recovery point and adding additional slurry somewhat down in the system and the bulk of the slurry near the main recovery point, this tends to not only improve the purity of the product, but more importantly permits much higher recovery of the desired butadiene without recycling excessive quantities of physically absorbed, but not complexed butenes from the top to the bottom of vessel 2, and therefore makes the addition of other complexing units unnecessary.

The acetylenes are a purity problem mainly in the low temperature stage in the removal of the butadiene from the feedstream. The optimum place to remove acetylenes is from the diolefin-lean process stream going from a high temperature into a low temperature stage, since at this point selectivity of acetylene vs. butadiene hydrogenation is much less critical than if the acetylenes are attempted to be removed from the feed prior to entering the complexing unit. Since in the drawing, we show only one stage for complexing, we would not attempt to make an acetylene removal at this point, but rather if the feed indicates a high level of acetylenes, we would then have a second complexing stage and remove the acetylenes through selective hydrogenation as the feed material passes from the first complexing stage to the second complexing stage, which would be conducted at a lower temperature (not shown). This scheme is based on the premise that the high temperature stage where the bulk of the butadiene is recovered is operated at conditions where very little, if any, acetylene will co-complex with the desirable product. However, the stream going from the high temperature stage to the low temperature stage will be sufficiently low in diolefin content, so that a relatively nonselective hydrogenation process which will clean up the acetylenes completely will not remove too much desirable butadiene diolefin.

The reaction conditions set forth in the reactor reject essentially all the methyl and ethyl acetylenes from the product 1,3-butadiene. In addition, it reduces the vinyl acetylene content in the product 1,3-butadiene to a level considerably below that present in the feedstream, thereby demonstrating a substantial process rejection of the troublesome vinyl acetylene. Therefore, for most occasions, it would not be necessary to involve a selective hydrogenation of the feedstream in order to remove the troublesome acetylene compounds.

In the bottom of vessel 2 sufficient residence time is provided to permit the desired complexing reaction to take place between the butadiene in feed and reflux streams and the cuprous halide. In order to achieve high solid loading and rapid complexing rates, the butadiene concentration in the liquid surrounding the slurried cuprous halide solid is kept at least 5 and preferably 6–10 mole percent above the equilibrium concentration as determined by the complexing-decomplexing equilibrium of butadiene with the solid, and the temperature and pressure prevailing in vessel 2.

This reactor is referred to as the "high driving force" reactor, whereby the high driving force is meant the difference in butadiene concentration in the liquid phase and the complexing equilibrium concentration.

The conditions of temperature, residence time and butadiene concentration are chosen to drive the solids loading to the range of 60–100% of theoretical, preferably 70–95% and most preferably, 75% to 85%. Driving the solids to these high loadings provide several benefits besides minimizing slurry circulation. Solids which are decomplexed from a state of high loading under mild decomplexing conditions are exceptionally active for subsequent complexing cycles and are able to complex butadiene from a low concentration stream without excessive residence time.

Second, solids which are highly complexed in the complexing vessel will have little tendency to be further complexed in the downstream transfer lines or in the subsequent stripping vessel. Inasmuch as the solids tend to foul surfaces which they contact while undergoing complexing, confinement of the complexing reaction to the complexing vessel eliminates fouling from the downstream equipment.

Since the complexing reaction is exothermic, the heat of complexing is dissipated most advantageously by autorefrigeration, i.e. boiling of uncomplexed feed out of the liquid slurry hold-up in the bottom of complexing vessel 2. The vapor rising up from this hold-up zone contains appreciable amounts of butadiene, since they are in vapor/liquid equilibrium with the slurry liquid, which, as previously discussed, contains in the order of 10–12 mole percent butadiene. It is in order to recover this boiled-off butadiene effectively that plates 3a, b and c are provided in the upper section of vessel 2, with fresh slurry introduced as hereinbefore mentioned.

After a suitable residence in complexing vessel 2, the slurry containing the inert liquid diluent and the complexed solid 1,3-butadiene cuprous halide sorbent particle is passed via line 12 to a flash tank 13 which is operated at a pressure of 31 p.s.i.a. and 120° F., whereby some of the butenes and other light material is flashed off and recycled back to the complexer 2 via line 20.

The overhead from complexer 2 containing some uncomplexed butadiene, butenes, acetylenes and any other light material is removed via line 10 and condensed in heat exchanger 11 whereafter a portion of said liquid is withdrawn as butene product via line 21 and a portion returned to the complexer 2 via line 40.

From the flash tank 13, the butadiene cuprous halide solid complex and the inert liquid diluent still containing some dissolved butenes and butadienes is passed via line 14 to the butene stripper 15.

Butene stripping is accomplished in vessel 15, and preferably the stripping conditions at the top of vessel 15 are maintained at or below the decomplexing temperature of butadiene with a cuprous halide sorbent.

Hot inert diluent vapor is introduced into the stripping tower 15 from line 17 at intermediate areas along the top of the tower. These areas are designated by 15a, 15b and 15c while a stream rich in 1,3-butadiene is introduced via line 16 into the bottom of the butene stripper 15. The condensing diluent vapors introduced in areas 15a, b and c will provide a heating effect to the slurry descending the tower. This will facilitate stripping the butenes from the slurry with the 1,3-butadiene vapor rising through the column. The stripping conditions through the vessel are maintained below the complexing temperature of the butadiene with the cuprous halide sorbent. The stripping conditions at the bottom of the butene stripper are operated at the temperature and pressures no hotter than the complexing equilibrium permits. The amount of butadiene vapor introduced via line 16 which is required to reduce the butene level of the stripped slurry stream down to 0.5–1.0 weight percent on contained butadiene is minimized by maximum use of diluent vapor in areas 15a, b and c within the above temperature restraints.

The principle of this stripping operation is that the butenes are displaced with the butadiene. Thus, the slurry leaving the bottom of stripper 15 will contain essentially only dissolved and complexed butadiene besides the slurried hydrocarbon and the cuprous halide particles.

The liquid on all plates of the stripping tower will contain an appreciable quantity of butadiene, which permits operation of the tower above atmospheric pressure. In addition, since butadiene is present on all plates of the tower, the vapor phase in equilibrium with these liquids will contain a high enough partial pressure of butadiene so that no decomplexing will take place at quite elevated temperatures. Thus, at the top of the stripping tower 15 the pressures range from 15 to 75 p.s.i.a. and the temperatures in the order of 60° to 130° F. are possible without any decomplexing taking place. It is to be understood that these pressures and temperatures of the displacement sections can be adjusted so that the butadiene concentration in the liquid vapor is at or above complexing equilibrium.

These conditions can be expressed by the following equation, wherein it is assumed a relative volatility of unity obtains between the various $C_4$ components contained in the slurry which also includes the 1,3-butadiene.

A generalized stripping equation is:

$$\frac{1-X_w}{1-X_t}=\left(\frac{(L)}{(V)}\right)^n$$

wherein L equals moles per hour in the liquid descending tower 15, V equals moles per hour of vapor, and $X_w$ is the mol fraction of one component in the bottoms liquid and $X_t$ is the mol fraction of the same component in the liquid on the top tray, and n equals a number of theoretical plates. The above equation demonstrates that provided there is excess butadiene complexed, butadiene of any desired purity can be obtained with a sufficiently large number of plates, provided the excess butadiene is used for stripping tower 21. The efficiency of the operation can be improved by cascading this displacement operation by means of intermediate "reboilers" where some of the $C_4$ content of the liquid is boiled off in order to decrease the L in the lower section of the tower.

In order to obtain this separation and at the same time maintain a number of plates within reason, it has been determined that the inert diluent can be introduced at the top of the tower in the form of a vapor at various trays, which can be easily determined by the conditions at the time so that through line 17 from a source to be described in more detail hereinafter, the inert vaporous diluent will in effect vaporize an equivalent amount of $C_4$ liquid resulting in condensation of the inert vaporous diluent, which will add to the slurry descending the tower. In this manner, the slurry concentration can be kept essentially constant throughout the tower and such an effect causes a reboiling along each of the plates of the tower in order to decrease the moles per hour of the $C_4$'s in the liquid descending the tower. On the other hand, the butadiene content increases in a downward direction in the tower, so that more and more butenes can be vaporized out of the liquid phase without dropping below the complexing disassociation pressure.

Alternatively, several reboilers could be placed along the tower or a large, single reboiler could be placed at the bottom of the tower. However, it is much simpler to use the recycle of the vaporous inert hydrocarbon diluent in order to cause the reboiling effect along the various plates.

The effluent containing the butenes and other lighter hydrocarbons exit the stripper via line 19 and are recycled back to the complexer 2.

The cuprous halide sorbent particles slurried in inert diluent and butadiene, stripped of any dissolved butenes, are then transported via line 35 in the liquid slurry to decomplexer 21 where they are subjected to conditions of temperature and pressure sufficient to desorb (decomplex) the previously sorbed 1,3-butadiene therefrom.

This decomplexing and desorbing can be accomplished at temperatures of about 120° to about 240° F. and at pressures ranging from about 10 to about 150 pounds per square inch absolute (p.s.i.a.). For each temperature there is an equilibrium butadiene partial pressure below which decomplexing takes place. Preferably, the decomplexing is conducted at temperatures ranging from about 150° to about 230° F. and pressures from about 15 to about 110 pounds per square inch p.s.i.a.

Since the object of this process is to maintain the activity of the cuprous halide sorbent particles, it is desired to remove the 1,3-butadiene from the liquid as rapidly as it is released during decomplexing to minimize the residence time of the solids in the decomplexer at the high temperatures.

Ordinarily, the presence of the extraneous 1,3-butadiene tends to reduce the decomplexing rates. Laboratory studies have shown that long holding (residence) times at high temperatures also tend to cause deactivation of the cuprous halide sorbent particles so that they are not as efficient when they are recycled for further use. The deactivated solids have a lower complexing rate in subsequent cycles.

High 1,3-butadiene concentrations in the decomplexer thereby retard the decomplexing rate, reduce sorbent activity and require larger decomplexing and complexing vessels to provide the longer residence times which are necessitated.

In order to overcome these obstacles, it has been found that if a hydrocarbon, preferably a paraffin, selected from the group consisting of hexane or pentane is countercurrently passed through the decomplexer, that beneficial results are obtained. The lower boiling paraffins lower the decomplexion temperature and enable the decomplexion to take place below a temperature of 160° F., which aids in the butadiene removal via line 24 at the top of the decomplexer tower 21. This hydrocarbon material can be initially inserted from a source not shown via line 25. However, after it is once inserted into the system, the conditions are such that it will be recycled by passing along with the butadiene via line 24 to a fractionating column 27, at which point it will be returned as a liquid or vapor from the bottom or from near the bottom via line 26 and inserted into decomplexing unit 21. Thus, it will be reused in 21 to strip complexed butadiene from the solid and slurry by being vaporized in the bottom of 21 and passing up through the tower countercurrently to the descending slurry.

The light hydrocarbon material is easily separated from the butadiene product in the separator 27. Also, small amounts in the slurry diluent of this paraffin will cause no appreciable problems. Normal hexane is the preferred material for this use.

A part of the diluent passes along with the butadiene via line 24 to the separator 27. The fractionator 27 is operated at conditions sufficient to control the diluent concentration in the final product of 1,3 butadiene. The diluent concentration in the butadiene product is maintained from 0.5 to 0.0 weight percent. Usually the butadiene diluent splitting in the fractionator 27 will be conducted at temperatures of 20° to 260° F. and accompanying pressures ranging from 15 to 100 p.s.i.a. Preferably, however, this splitting (fractionation) is conducted so as to limit the inert diluent concentration in the exiting 1,3-butadiene product stream 32 to from 0.2 to 0.0 wt. percent diluent. Preferably, this operation is conducted at temperatures ranging from 25° to 250° F. with pressures ranging from 15 to 75 p.s.i.a.

Since diluent is added to the process at many points for flushing pump seals, for level control and as a source of heat in stripping the butadiene from the cuprous halide sorbent particles, the concentration of the solids in the slurry in decomplexer 21 has formerly been increased by removing the diluent through boiling. However, this required a long residence time and temperatures which were much greater than were required for complete decomplexing and butadiene removal. As stated hereinabove, these conditions cause the deactivation of the solids so that the rate of complexing decreases in each complexing cycle. Furthermore, the concentration to which the slurry can be raised by boiling is limited by pressure drop in the outlet line from the decomplexer vessel and the transfer pump suction line 7. If the slurry concentration exceeds about 50 to 55 wt. percent solids, the slurry becomes thick and viscous whereby the suction line pressure drop becomes excessive, and the transfer pump 8 cavitates or loses suction, and therefore the slurry cannot be moved via line 9 back to the complexing unit 2.

In order to eliminate the difficulties and problems caused by concentrating the decomplexed slurry through boiling, a separation device 30 is inserted in line 9, and the residence time and temperature in the decomplexing vessel 21 are minimized with residence time in the order of 10 minutes or less, and temperatures below about 180° F.; the residual butadiene after this step is about 5 to 10% of the theoretical butadiene capacity complexed. Since little diluent is removed during decomplexing, the decomplexed slurry at this point is dilute and free-flowing and causes no difficulty with transfer pump suction pressure. Because the solids are subjected to mild conditions, there is little deactivation and the solids are ready to complex at the higher rate in the next cycle.

However, in order to concentrate the slurry before reintroduction to the complexer, the slurry is pressured through a filter system 30 on its way to the complexer. In this system, the excess diluent is filtered from the slurry and the concentrated slurry passes via line 9 through chiller 5 into the complexer unit 2. The slurry passes through the filter system 30 under pressure; its concentration is not limited by the need to maintain low viscosity for good pump suction and slurry concentrations of 60 to 70 wt. percent solids can be obtained. The diluent is recycled via line 28 back to the decomplexer 21, but it may also be used for pump seal flushing, and can be vaporized to provide heating vapor into line 17 and tower 27.

Preferably, any form of separating device can be employed in order to remove some of the diluent in order to increase the weight percent of solids in the slurry. However, preferably the filter employed in the subject process is a jacketed length of porous metal line through which the slurry is pumped. Some of the slurry liquid passes through the porous metal and is returned via line 28. Other filter system designs are possible, including agitated vessels containing filter leaves, or systems based on centrifugal separation.

Once the startup has been accomplished, the recycle slurry stream 7 usually provides sufficient paraffin diluent for lined out operation in a continuous process. Consequently, no additional diluent need to be added except for makeup amounts to replenish diluent lost in normal operations and via purges to maintain diluent purity.

Any organic liquid diluent can be used in the essentially anhydrous, all slurry 1,3-butadiene separation and recovery process of the subject invention, which is essentially inert to reaction with said cuprous halide sorbent particles and which has a boiling point higher than 1,3-butadiene, butenes and butanes and which either has a boiling point lower than the sorbent deactivation temperature or if, per se, it is higher, it is used in the presence of an inert boiling point depressant which lowers the boiling point below said sorbent deactivation temperature. It is usually preferable to use an inert liquid diluent which has a boiling point below the sorbent deactivation temperature.

Preferred inert liquid diluents are $C_5$ to $C_7$ paraffins, including mixtures thereof such as pentanes, hexanes and heptanes, especially n-pentane, isopentane, n-hexane, n-heptane, isoheptane and isomers of mixtures containing any two or more $C_5$ to $C_7$ alkanes. Heptane is preferred in the subject process as the diluent.

Heavier hydrocarbons, $C_8$ to $C_{12}$ alkanes, do have a salient advantage due to their easier separation from the 1,3-butadiene product and to their higher molecular weight. They result in less of a diluting effect during the complexing steps; moreover, these diluents lessen recycle buildup in the stripping and complexing operations. Suitable $C_8$ to $C_{12}$ alkanes which can be used with suitable boiling point depressants, where applicable, include, e.g., n-octane, n-nonane, n-decane, n-dodecane, isomers or mixtures containing two or more $C_8$ to $C_{12}$ alkanes.

In addition to the above paraffins, replacement of half of the $C_5$ to $C_7$ paraffin with a $C_{20}$ oil on a volume/volume basis helps in the overall complexing and stripping loads, since it reduces the moles of diluent circulating and diminishes fouling in the complexer by preventing any buildup of hard deposit on the walls of any of the vessels. These buildups can form with lighter solvents in normally "dry" spots of the equipment due to splashing of slurry against the wall, followed by evaporation of the entrained light solvent into the vapor space. A heavy diluent constituent, on the other hand, will not evaporate easily and thus keeps the deposit soft.

According to the present invention, a portion, e.g., usually at least 25 wt. percent of the total amount of cuprous halide solid sorbent particles are sorption-active particles (except, of course, at startup, when all or almost all the cuprous halide can be commercial cuprous halide salt). The term "sorption-active" as employed herein is employed to denote cuprous halide sorbent particles which have a porosity of about 10% (of the total volume of a particle) 550 to 10,000 A. pores, as determined by mercury porosimeter measurements. Preferably, at any given stage in the above-indicated 1,3-butadiene separation and recovery process, the concentration of sorption-active cuprous halide particles (at lined out conditions) ranges from about 75 to about 100% by weight based on the total amount of solid particles in the slurry (total amount of cuprous halide solids present in the slurry). The sorptive capacity of these sorption-active sorbent particles usually ranges from about 35 to 99+ percent and more preferably from 50 to 99+ percent based on the theoretical capacity for sorption of 1,3-butadiene (stoichiometric ratio: 1 mole of 1,3-butadiene complexes with 2 moles of said cuprous halide). The overall sorptive capacity of the total amount of sorbent particles present in the slurry can range from 20 to 95%, which is an average figure giving the overall or average sorptive capacity of the total amount of cuprous halide sorbent present in the slurry including material which is of high sorptive capacity and material having either very low sorptive capacity or that material which is raw (comparatively nonporous and inactive) cuprous halide salt.

As noted hereinabove, it is a highly beneficial aspect of the present invention that material having low sorptive capacity for sorbing 1,3-butadiene can be employed at startup, or to constitute makeup cuprous halide sorbent, or even to constitute a predominant or substantial portion of the sorbent employed according to this invention. This is possible due to the surprising increase in sorptive activity level of the cuprous halide sorbent particles demonstrated by higher lined out sorptive capacity as succeeding complexation, stripping and decomplexation cycles are put on the sorbent particles during continual or continuous operation of the process of this invention. Thus, it is possible to add makeup sorbents as the raw (nonporous and nonsorptive-active) salt which is then activated during the repeated sorption-stripping, and desorption cycles put on the sorbent during repeated operations in any given 1,3-butadiene separation and recovery operation. Furthermore, the entire or at least a substantial portion of the sorbent can be raw cuprous halide salt which is activated by repeated cycling in the manner mentioned hereinabove. However, even the raw (commercial grade) cuprous halide salt should be 95+ percent pure material being substantially anhydrous ($<1.0$ weight percent water). Preferably, however, at the outset of the process and throughout its extent, 25 to 100 wt. percent of the total cuprous halide sorbent is sorption-active material as defined hereinabove.

The sorption-active cuprous halide sorbent particles can be prepared from fairly high purity, viz 95+ percent pure, commercial cuprous chloride, cuprous bromide, and cuprous iodide salts with less than 1 wt. percent moisture content. The preferred cuprous halide sorbents are cuprous chloride sorbents prepared from 99+ percent pure CuCl salt which is substantially moisture-free, viz contains less than 0.5 wt. percent moisture (based on dry CuCl). As noted above, the sorption-active porous sorbent particles can be prepared from the raw cuprous halide salts in situ by cycling sorption-stripping-decomplexing operations outlined hereinabove. However, the sorption-active cuprous halide sorbent particles need not be prepared in this manner. They can be prepared in accordance with a wide variety of sorption-active sorbent preparation procedures, e.g., as set forth in U.S. Ser. Nos. 333,925 and 333,926 filed on or about Dec. 27, 1963. The disclosure of these cuprous halide sorbent preparation procedures is incorporated herein by reference.

The present invention will be illustrated in further detail in the following example, which is to be considered as illustrative of the present invention and not limiting thereon.

EXAMPLE 1

A $C_4$-hydrocarbon mixture at about 100° F., containing 254 mols/hr. (41.7 mol percent) of butadiene and 355 mols/hr. (58.3 mol percent) of mixed butenes and butanes is introduced via line 1 into complexing vessel 2. The bottom hold-up portion of this vessel is agitated and maintained at 28 p.s.i.a. and 90° F.

Freshly regenerated slurry of decomplexed cuprous halide, e.g. CuCl, in inert diluent, e.g. heptane, is introduced into vessel 2 via line 9. The quantity of this slurry introduced is 238 mol/hr. of CuCl and 193 mol/hr. of heptane, which is a 55 wt. percent solid content slurry.

Complexing will occur in the bottom of vessel 2, resulting in evolution of heat. This heat is dissipated by autorefrigeration, i.e. boiling of the liquid and the generation of vapors containing 22 mol percent butadiene, 74 mol percent other $C_4$ hydrocarbons, and 4% $C_7$. These vapors are allowed to contact descending CuCl slurry on plates 3a, 3b and 3c. Fresh CuCl slurry in heptane (55 wt. percent solids) is introduced on each of these plates, the total amount for all three plates being 450 mols/hr. of CuCl in 365 mols/hr. of heptane. The amount of slurry introduced on the uppermost plate 3a is about 15-20% of the total slurry injected on the plates; the amount of slurry to plate 3b is about 20-30%, while the slurry fed to plate 3c is the remainder, or 50-65% of said slurry.

Cold butene reflux is returned to the top of complexing vessel via line 40. This liquid consisting of about 680 mols/hr. of mixed $C_4$'s is at 50° F. and effectively refrigerates the slurry on the plates to a temperature much below that obtained in the bottom of vessel 2. As a result, these plates will be at conditions promoting complexing of butadiene rising up in the vapors from the bottom zone of vessel 2. Thus, the middle plate 3b is at 60° F., while the top plate will be at 52-55° F.

These low temperatures and consequent high $C_4$-contents in the liquid result in removal of butadiene from the rising vapor to such an extent that the butadiene content of the vapor leaving the top of vessel 2 is only 2.8%.

The overhead product consists of 364 mols/hr. of $C_4$'s, comprising 2.8 mol percent butadiene, and 97.2% other $C_4$'s.

Actually, it is advantageous to provide one or two slurry-free plates on the top of vessel 2 (not shown) to provide a refluxing section to strip out any $C_7$ diluent from the vapor which would otherwise contaminate the butene overhead product.

The overhead condenser 11 of vessel 2 operates at a condensing temperature of 50° F., at 25 p.s.i.a.

It should be noted that the gradual introduction of fresh slurry into the plate section of vessel 2 results in an optimum arrangement to recover the butadiene boiling off from the autorefrigerated complexing section without setting up a large butene-butadiene recycle between top and bottom of vessel 2.

The slurry leaving complexer 2 will consist of solid butadiene-CuCl complex (80% complexing efficiency or loading) and a liquid comprising both $C_4$'s and $C_7$. The actual composition of this slurry is as follows.

| Liquid: | Mols/hr. |
|---|---|
| Butadiene | 152 |
| Butenes | 549 |
| Heptane | 608 |
| Solid: | |
| Butadiene | 275 |
| CuCl | 688 |

As discussed previously, the butadiene content of the slurry liquid is about 12 mol percent which is far above the equilibrium butadiene concentration at 90° F., at which complexing will occur. This results in a high driving force to exist in vessel 2, allowing complexing to occur rapidly and to a high loading of the solid. Residence time of slurry in vessel 2 is 20 min.

However, as a result of this excess butadiene concentration, the slurry leaving vessel 2 via line 12 can be heated and flashed at 120° F. without resulting in any decomplexing of the solid. This is done in flash pot 13 by a combination of heating in heat exchangers and the introduction of $C_7$ vapor. The resultant vapor is returned to vessel 2 via line 20. It will contain 21 mol percent butadiene. The slurry being fed from flash pot 13 to tower 15 via line 14 will contain only about one-half the C₄'s dissolved in the slurry which entered flash pot 13 via line 12.

Tower 15 is the butene stripper where the butenes dissolved in the slurry liquid are stripped out by a combination of heptane and butadiene vapors. As the slurry liquid descends the tower, its temperature increases, but so will the butadiene concentration in the liquid, and the two are allowed to increase in concert with each other in such a way that no decomplexing will occur in the tower.

For this purpose, a butadiene rich stripping vapor is introduced at the bottom of the column via line 16. For the purpose of increasing the temperature on the plates, $C_7$ vapor is introduced via line 17 and injected at a plurality of points into the tower, shown here as plates 15a, 15b and 15c.

The total amount of $C_7$ vapor injected into the above plurality of points along the tower is 150 mols/hr., resulting in a gradual and controlled rise in slurry temperature from 120 to 150° F. Tower 15 operates at 24 p.s.i.a. top and 27 p.s.i.a. bottom pressure. The slurry leaving the bottom of this tower contains no more than 1 mol/hr. of butenes and butanes, the remainder being complexed and dissolved butadiene and $C_7$ diluent.

The overhead vapor from tower 15 is returned to complexer 2 via line 19. It is first condensed and then injected into vessel 2 as a liquid. It consists of 96 mols/hr. of butadiene, 225 mols/hr. of other C₄'s and 30 mols/hr. of $C_7$.

The stripper bottoms are now fed to decomplexer 21 via line 35. This decomplexer operates with a bottoms temperature of 212° F. at a pressure of 28 p.s.i.a. All the complex in the feed will break down under these conditions, resulting in release of all the butadiene from the top of the tower via line 24.

A portion of this overhead stream 24 goes to butadiene rerun tower 27, where a careful split between butadiene overhead product 32 and $C_7$ diluent recycle bottoms 26 is achieved by simple fractionation.

A second portion of decomplexer overhead, stream 24a, is preferably recycled directly to the bottom of butene stripper 15 via line 16. This stream is a mixture of 71 mol percent butadiene and 29 mol percent heptane, and performs very adequately as the butadiene-rich stripping vapor in tower 15. Less preferably, but equally satisfactory as a stripping agent, a portion of rerun tower 27 overhead (stream 32) can be used for the same purpose. Some lowering of the bottoms temperature in tower 21 can be achieved by introducing a lighter hydrocarbon, such as $C_5$ or $C_6$, into the bottom of the column via line 24. This, however, introduces contamination problems in the product streams necessitating considerable additional fractionation on both the butene and butadiene products. For this reason, it is preferable to use an isoheptane diluent which by itself has a low boiling point (175–190° F.) and is easily separated from the C₄-products.

The butadiene product taken off as overhead from tower 27 is 99.6 mol percent pure and represents a 96% recovery of the butadiene present in the feed.

The generated slurry from the bottom of decomplexer 21 has the following composition.

| | Mols/hr. |
|---|---|
| $C_7$ | 802 |
| CuCl | 810 | or 50 wt. percent solids. This is fed to filter 30 where 145 mols/hr. of $C_7$ filtrate are separated away from a thickened slurry of 55 wt. percent solids which is recycled to the complexer vessel 2 as heretofore described. The $C_7$ filtrate is recycled back to the feed decomplexer 21 in order to thin down the slurry in that tower to a consistency amenable to easy handling on plates and in exchangers.

What is claimed is:

1. An improved process for recovering high purity 1,3-butadiene from a hydrocarbon feedstream containing it along with C₄ monoolefins and C₄ alkanes which comprises the steps of:

(a) contacting said feedstream in a reactor at a given temperature and pressure sufficiently above the complexing equilibrium point for the 1,3-butadiene with a liquid slurry containing solid, sorption-active cuprous halide sorbent particles selected from the group consisting of cuprous chloride, cuprous bromide and cuprous iodide having a porosity above about 10% (of the volume of the particles), 550 to 10,000 A. pores in an essentially anhydrous organic liquid slurry medium containing an extraneous inert liquid paraffin diluent which is essentially inert to reaction with said cuprous halide sorbent which has an atmospheric boiling point higher than 1,3-butadiene, C₄ monoolefins and C₄ alkanes contained in said feedstream and which has an atmospheric boiling point lower than the temperature at which said cuprous halide particles deactivate significantly with the proviso that said paraffin diluent can be one which, per se, has an atmospheric boiling point at or above said deactivation temperature provided that such paraffin diluent is employed in the presence of an inert boiling point depressant which lowers the boiling point of said paraffin diluent to a temperature below said sorbent deactivation temperature at temperature and pressure conditions above the complexing equilibrium point for effecting the liquid phase formation of a said cuprous halide 1,3-butadiene solid complex, thereby driving the 1,3-butadiene in a direction so as to form said complex;

(b) introducing a portion of said slurry at various points along said reactor;

(c) countercurrently contacting said slurry portions with said feedstream in said reactor;

(d) passing said slurry and said cuprous halide 1,3-butadiene solid complex to a stripping zone;

(e) introducing vaporous inert liquid paraffin diluent at various points along said zone;

(f) countercurrently contacting said vaporous inert diluent with said liquid slurry medium containing said solid complex;

(g) maintaining a sufficient partial pressure of uncomplexed 1,3-butadiene in said stripping zone sufficient to replace the butenes dissolved in the inert diluent with 1,3-butadiene;

(h) stripping from said solid complex and liquid slurry medium uncomplexed materials and materials less preferentially complexed than 1,3-butadiene while maintaining a liquid slurry of said solid complex particles in said mixture of inert liquid diluent and dissolved 1,3-butadiene;

(i) desorbing said solid complex particles in the presence of said liquid slurry diluent and also in the presence of a hydrocarbon selected from the group consisting of heptane and pentane;

(j) separating the dissolved and decomplexed 1,3-butadiene from said diluent; and (k) recovering substantially pure 1,3-butadiene.

2. A process according to claim 1 further including the step of recycling said liquid slurry containing solid sorption-active cuprous halide sorbent particles to said complexing reactor.

3. A process according to claim 2 further including the step of filtering a portion of the inert paraffin diluent from said slurry medium and recycling said liquid paraffin diluent back to the decomplexing or fractionating step whereby the percentage of sorption-active cuprous halide sorbent particles in the slurry going to the complexing step is increased.

4. A process according to claim 1 wherein said diluent is either heptane or isoheptane.

5. A process according to claim 1 wherein the pressures in said complexing reaction are maintained in the range from 17 to 42 p.s.i.a. at a temperature ranging from 90° to 110° F. and herein the butadiene concentration in the slurry medium is maintained in the range of from 10 to 12 mol percent.

6. A process according to claim 1 wherein the temperature in the decomplexing step is maintained below 180° F.

7. A process according to claim 1 wherein the solids are driven to greater than 70% of the theoretical loading of ½ mole butadiene per mole cuprous halide in the complexing reactor before stripping.

8. A process according to claim 1 further including the step of contacting said feedstream with said slurry in at least one other reactor prior to passing said slurry and said cuprous halide 1,3-butadiene solid complex to said stripping zone and selectively hydrogenating said feedstream to remove acetylenes therefrom between said contacting steps.

9. A process according to claim 1 wherein approximately 1 to 10 volume percent of the slurry is introduced at the top of the reactor at a temperature ranging from 30 to 45° F., 10 to 40 volume percent of the slurry is introduced intermediate the reactor at a temperature ranging from 45 to 70° F. and 50 to 90 volume percent of the slurry is introduced at the bottom of the reactor at a temperature ranging from 70 to 110° F.

10. A process according to claim 1 further including the step of recycling chilled spent butenes into said reactor at its top.

11. A process according to claim 1 further including the step of maintaining the temperature in said stripping zone at the maximum permissible without decomplexing the 1,3-butadiene solid complex.

References Cited

UNITED STATES PATENTS

| | | | |
|---|---|---|---|
| 3,206,521 | 9/1965 | Long | 260—681.5 C |
| 3,340,004 | 9/1967 | Hunter et al. | 260—681.5 C |
| 3,348,908 | 11/1967 | Long et al. | 260—681.5 C |
| 3,412,172 | 11/1968 | De Feo et al. | 260—681.5 C |

DELBERT E. GANTZ, Primary Examiner

G. E. SCHMITKONS, Assistant Examiner

U.S. Cl. X.R.

23—97